US008279137B2

(12) United States Patent
DeJean, II

(10) Patent No.: US 8,279,137 B2
(45) Date of Patent: Oct. 2, 2012

(54) WIRELESS ANTENNA FOR EMITTING CONICAL RADIATION

(75) Inventor: Gerald Reuben DeJean, II, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 12/269,886

(22) Filed: Nov. 13, 2008

(65) Prior Publication Data

US 2010/0117926 A1 May 13, 2010

(51) Int. Cl.
*H01Q 15/14* (2006.01)
*H04B 7/24* (2006.01)

(52) U.S. Cl. ................. 343/912; 343/832; 343/700 MS; 455/39; 455/456.2

(58) Field of Classification Search .................. 343/912, 343/700 MS, 795; 455/562.1, 418, 456.2
See application file for complete search history.

(56) References Cited

U.S. PATENT DOCUMENTS

| | | | | |
|---|---|---|---|---|
| 1,860,123 | A * | 5/1932 | Yagi | 343/833 |
| 4,792,810 | A | 12/1988 | Fukuzawa et al. | |
| 5,220,335 | A | 6/1993 | Huang | |
| 6,972,729 | B2 * | 12/2005 | Wang | 343/833 |
| 7,064,725 | B2 | 6/2006 | Shtrikman et al. | |
| 7,397,425 | B2 | 7/2008 | Ranta et al. | |
| 7,408,521 | B2 | 8/2008 | Smith et al. | |
| 2006/0171357 | A1 * | 8/2006 | King et al. | 370/331 |
| 2007/0152903 | A1 * | 7/2007 | Lin et al. | 343/795 |
| 2007/0203672 | A1 * | 8/2007 | Desai et al. | 702/189 |
| 2011/0207444 | A1 * | 8/2011 | Hansen et al. | 455/414.1 |

FOREIGN PATENT DOCUMENTS

| | | | |
|---|---|---|---|
| JP | 2003258548 | A | 9/2003 |
| JP | 2006074697 | A | 3/2006 |
| WO | 2006032305 | A1 | 3/2006 |

OTHER PUBLICATIONS

Gerald R. DeJean; Manos M. Tentzeris; , "A New High-Gain Microstrip Yagi Array Antenna With a High Front-to-Back (F/B) Ratio for WLAN and Millimeter-Wave Applications," Antennas and Propagation, IEEE Transactions on , vol. 55, No. 2, pp. 298-304, Feb. 2007.*

Gray, D.; Jun Wei Lu; Thiel, D.V.; , "Electronically steerable Yagi-Uda microstrip patch antenna array ," Antennas and Propagation, IEEE Transactions on , vol. 46, No. 5, pp. 605-608, May 1998.*

Wang, J.; Triplett, D.; Stevens, C.; , "Broadband/Multiband Conformal Circular Beam-Steering Array," Antennas and Propagation, IEEE Transactions on , vol. 54, No. 11, pp. 3338-3346, Nov. 2003.*

(Continued)

*Primary Examiner* — Hoang V Nguyen
*Assistant Examiner* — Amal Patel

(57) ABSTRACT

An antenna described herein includes a driven patch that is configured to emit radiation in a broadside direction in response to receiving excitation current, wherein the driven patch has a first radiating edge and a second radiating edge that are approximately parallel to one another. The antenna also includes a reflector element that is configured to reflect radiation emitted from the first radiating edge in a quasi-endfire direction. The antenna can also include two director elements that are configured to direct radiation emitted from the second radiating edge of the driven patch in a quasi-endfire direction.

16 Claims, 9 Drawing Sheets

OTHER PUBLICATIONS

Honma, N.; Seki, T.; Nishikawa, K.; Tsunekawa, K.; Sawaya, K.; , "Compact Six-Sector Antenna Employing Three Intersecting Dual-Beam Microstrip Yagi-Uda Arrays With Common Director," Antennas and Propogation, IEEE Transactions on, vol. 54, No. 11, pp. 3055-3062, Nov. 2006.*

"International Search Report", Mailed Date: Jul. 15, 2010, Application No. PCT/US2009/064486, Filed Date: Nov. 13, 2009, pp. 8.

Gray, et al., "Electronically Steerable Yagi-Uda Microstrip Patch Antenna Array", Retrieved at "www98.griffith.edu.au/dspace/bitstream/10072/12305/1/9019.pdf" in the proceedings of IEEE Transactions on Antennas and Propagation, vol. 46, No. 5, May 1998, pp. 605-608.

Kilgus, Charles C., "Shaped-Conical Radiation Pattern Performance of the Backfire Quadrifilar Helix", retrieved at <<http://ieeexplore.ieee.org/iel6/8/25542/01141084.pdf?tp=&isnumber=&amumber=1141084>>, IEEE Transactions on Antennas and Propagation, May 1975, pp. 392-397.

Huang, John, "Circularly Polarized Conical Patterns from Circular Microstrip Antennas", retrieved at <<http://ieeexplore.ieee.org/iel6/8/25649/01143455.pdf?tp=&isnumber=&arnumber=1143455>>, IEEE Transactions on Antennas and Propagation, vol. AP-32, No. 9, Sep. 1984, pp. 991-994.

Lau, et al. "A Wideband Circularly Polarized Patch Antenna with Conical Radiation Pattern", retrieved at <<http://ieeexplore.ieee.org/iel5/4084859/4084860/04085278.pdf?tp=&isnumber=&arnumber=4085278>>, pp. 3.

Uysal, et al., "Bowtie Patch Antennas and Simple Arrays for Wireless Indoor Communications", retrieved at <<http://ieeexplore.ieee.org/ie15/22/16667/00769345.pdf?tp=&isnumber=16667&arnumber=769345>>, IEEE Transactions on Microwave Theory and Techniques, vol. 47, No. 6, Jun. 1999, pp. 738-745.

Nesic, et al., "New Circularly Polarized Planar Printed Antenna with Conical Radiation Pattern", retrieved at <<http://ieeexplore.ieee.org/iel4/5654/15165/00690777.pdf?tp=&isnumber=15165&arnumber=690777>>, pp. 1438-1441.

Chen, et al., "Reconfigurable Square-Ring Patch Antenna with Pattern Diversity", retrieved at <<http://ieeexplore.ieee.org/iel5/8/4084729/04084772.pdf?tp=&isnumber=&arnumber=4084772>>, IEEE Transactions on Antennas and Propagation, vol. 55, No. 2, February, pp. 472-475.

"High Gain Antenna for R-TNC Connectors", retrieved at <<http://www.linksys.com/servlet/Satellite?c=L_Product_C2&childpagename=US%2FLayout&cid=1115416829416&pagename=Linksys%2FCommon%2FVisitorWrapper>>, Sep. 26, 2008, p. 1.

* cited by examiner

WIRELESS ANTENNA FOR EMITTING CONICAL RADIATION

BACKGROUND

The use of wireless technology has become prevalent in today's society. For instance, many individuals use cellular phones to communicate with others. Some cellular phones are also equipped with applications that allow users to have immediate access to their email as well as the Internet, thereby allowing the user to, for instance, access the latest news, check stock quotes, and perform other activities. Furthermore, many homes, businesses and workplaces have become equipped with wireless networks that enable users to connect to an intranet and/or the Internet.

In still yet another example, gaming systems can be equipped with wireless capabilities such that users of a gaming system can employ controllers that are in wireless communication with a gaming device. For instance, depression of a button or a particular motion can be transmitted from a controller to the gaming system.

When transmitting or receiving data by way of a wireless connection, antennas are employed to resonate at a set frequency such that the antenna emits radiation that is encoded with signals over a geographic region. Pursuant to an example, a wireless router may include one or more antennas that are employed to emit radiation that is intended to reach one or more rooms of a building. Conventional wireless routers employ standard monopole antennas which can only provide omni-directional radiation (e.g., radiation in the shape of a circle) with achievable antenna gains between two and seven dBi. Accordingly, placement of the wireless router and the antenna(s) therein becomes important in order to substantially maximize an amount of data that can be transmitted between the router and a receiving (wireless) device. In addition, for antennas on a lower end of an achievable gain scale (e.g., two to four dBi), more power must be input to the antenna in order to transmit a signal when compared to power input for antennas on a higher end of an achievable gain scale. Moreover, conventional wireless routers do not optimize use of power, as they transmit in a three hundred sixty degree area even when a single user or a relatively small group of users reside in a particular region (e.g., a relatively small subset of the 360 degrees). In other words, the wireless antenna emits radiation in regions of a room or building where no users reside.

SUMMARY

The following is a brief summary of subject matter that is described in greater detail herein. This summary is not intended to be limiting as to the scope of the claims.

Various technologies pertaining to wireless communications are described in greater detail herein. The technologies described herein can be employed in any suitable wireless system, including but not limited to in a cellular telephone tower, in a gaming system, in a wireless router, etc. In an example, an antenna described in greater detail herein can be employed in a wireless transmission device such as a wireless router. The antenna can include a driven patch that can be a broadside radiator. In other words, the driven patch can be placed on a substrate and can maximally emit radiation in a direction that is substantially perpendicular to a plane of the substrate. The antenna can additionally include a reflector element that is configured to reflect radiation emitted from a first radiating edge of the driven patch. The antenna can also include two director elements that are configured to direct radiation emitted from a second radiating edge of the driven patch. The reflector element and the two director elements act in concert to alter direction of maximal radiation emission from the driven patch from a broadside direction to a quasi-endfire direction. The two director elements act to increase the gain of radiation emitted from the driven patch through constructive interference. Direction of maximal radiation emission from the antenna can be altered by changing frequency of radiation emitted by the antenna.

The antenna described above can be positioned adjacent to three other substantially similar antennas in a cross-like configuration to provide for three hundred and sixty degree coverage. For instance, the reflector elements of each of the four antennas can be positioned towards a center of the cross-like configuration. Each of the antennas can direct radiation to an approximately ninety degree area of coverage. Accordingly, excitation current can be selectively provided to a subset of the four antennas to provide radiation to a particular area (e.g., where less than three hundred and sixty degree coverage is needed). In an example, a user employing a portable computing device may desirably receive radiation from a wireless router that includes the four antennas. The user may be positioned relative to the wireless router such that only one of the four antennas is needed to provide radiation to the user. Thus, excitation current can be selectively provided to one of the antennas in the wireless router while not provided to the other three antennas in the wireless router, which increases gain of radiation provided to the user and reduces power used by the wireless router.

Other aspects will be appreciated upon reading and understanding the attached figures and description.

DETAILED DESCRIPTION

Figure 1:
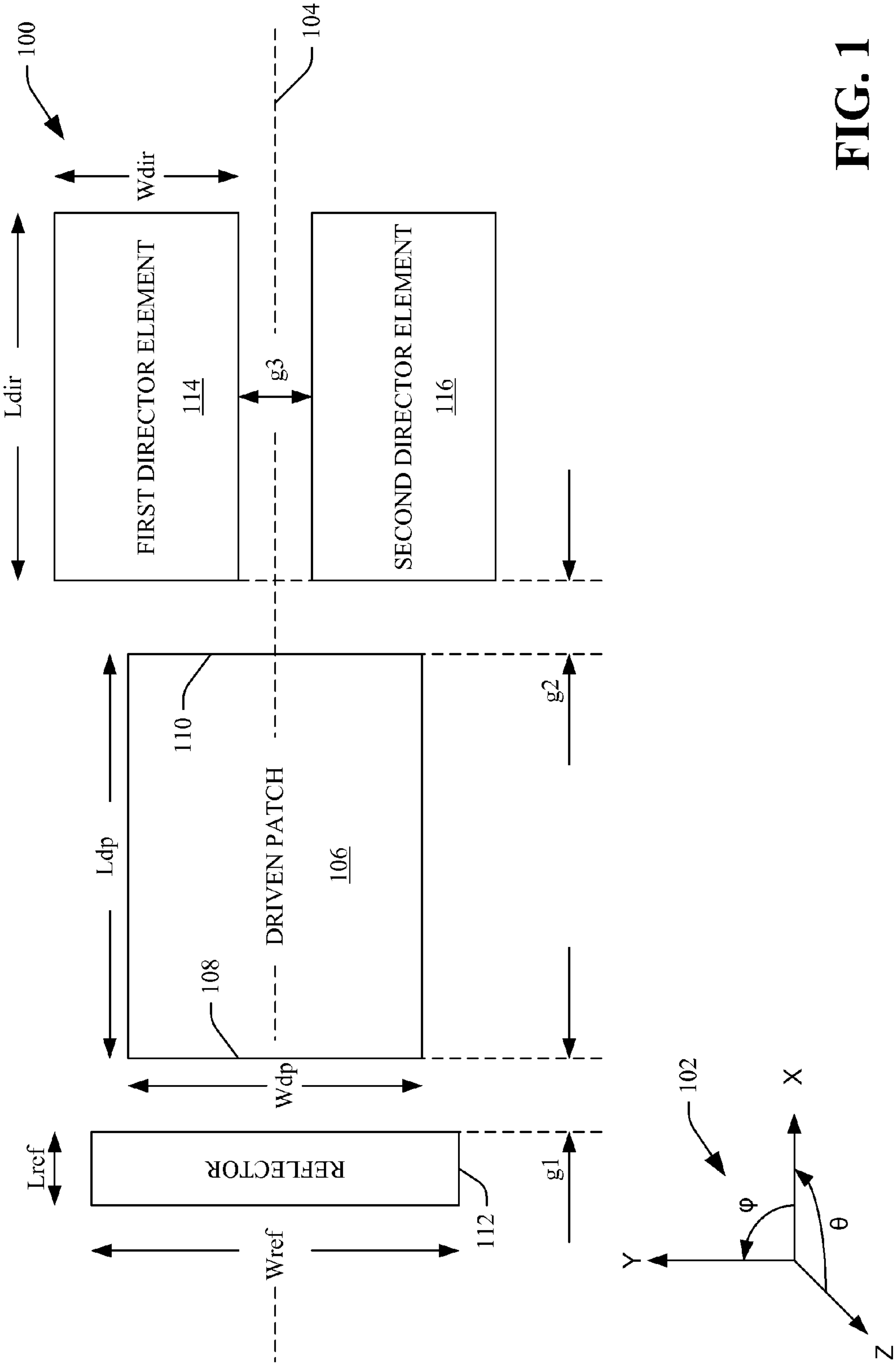
FIG. 1 is an example depiction of an antenna.

Various technologies pertaining to wireless communications will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example antenna 100 is illustrated. The antenna 100 can be used in various wireless communication devices, including but not limited to a wireless router, a gaming system, a cellular telephone transmission tower, or other suitable wireless communications device that transmits wireless signals. The antenna 100 can be a planar antenna that is generally configured along an x-y plane (as shown by a coordinate system 102). Further, the antenna 100 can be approximately symmetric about an axis 104 that is substantially parallel to the x axis as shown in the coordinate system 102.

The antenna 100 includes a driven patch 106 that can be configured to emit radiation in response to receiving excitation current from a microstrip, a feed, or other suitable source. As shown herein, the driven patch 106 includes a first radiating edge 108 and a second radiating edge 110 that are substantially parallel to one another. The driven patch 106 can be a broadside radiator, such that radiation is maximally emitted from the driven patch 106 along a z-axis (e.g., approximately perpendicular to the x-y plane).

The antenna 100 can also include a reflector element 112 that is configured to reflect radiation emitted from the driven patch 106 proximate to the first radiating edge 108. The reflector element 112 can act to alter position of maximal radiation emission by an angle of θ degrees from the z-axis, where θ is greater than zero. As shown in FIG. 1, the width of the reflector element 112 ($W_{ref}$) can be greater than the width of the driven patch 106 ($W_{dp}$). Configuring the width of the reflector element 112 to be greater than the width of the driven patch 108 can prevent the reflector element 112 from becoming resonant. Preventing the reflector element 112 from becoming resonant can allow the reflector element 112 to reflect radiation emitted from the driven patch 106 along the x-axis.

Further, the reflector element 112 can be separated from the first radiating edge 108 of the driven patch 106 by a first gap ($g_1$). The size of the gap $g_1$ can be selected to facilitate adequate coupling between the driven patch 106 and the reflector element 1 12. If the first gap $g_1$ is too large, near fields from the driven patch 106 to the reflector element 112 may be inadequate. Length of the reflector element 112 ($L_{ref}$) can be selected in view of space constraints pertaining to the antenna 100.

The antenna 100 can additionally include two director elements 114 and 116 that are configured to direct radiation emitted from the driven patch 106 proximate to the second radiating edge 110 along the x-axis. Thus the reflector element 112 and the two director elements 114 and 116 can cause the antenna 100 to act as a quasi-endfire radiator. The first and second director elements 114 and 116 can be separated by the driven patch 106 by a second gap ($g_2$).

In an example, the second gap $g_2$ between the first and second director elements 114 and 116 can be substantially similar to the first gap $g_1$ that separates the driven patch 106 from the reflector element 1 12. Again, size of the second gap $g_2$ can be selected to facilitate adequate coupling between the driven path 106 and the first and second director elements 114 and 116. If the size of the second gap $g_2$ is too small, near fields of the antenna 100 can be interrupted and spurious lobes can arise in the radiation pattern emitted by the antenna 100, causing such pattern to become distorted. If the second gap $g_2$ is too large, near fields from the driven patch 106 to the first and second director elements 114 and 116 will be inadequate, and the antenna 100 will act as a broadside radiator (e.g., as the driven patch 106 would be the only element in the antenna 100 that is radiating).

The first director element 114 and the second director element 116 can be separated from one another along the y-axis by a third gap ($g_3$). The size of the third gap $g_3$ can be selected based upon a desired amount of radiation alteration along the y-axis. In an example, length of the first and second director elements ($L_{dir}$) 114 and 116 can be slightly smaller than the length of the driven patch ($L_{dp}$) 106. For instance, it is known that the resonant frequency ($f_{res}$) can be approximately $\lambda_g/2$, where $\lambda_g$ represents a guided wavelength and takes into account an effective permittivity $\epsilon_{eff}$ of the substrate that the antenna 100 is mounted upon. The first and second director elements 114 and 116 can be resonant along their lengths, and thus if the length of the director elements 114 and 116 are slightly smaller than the driven patch 106, the driven patch 106 can be excited by a slightly higher resonant frequency. Since the resonant frequency of the driven patch 106 and the first and second director elements 114 and 116 are relatively close together, if good impedance matching exists at such frequencies, overall impedance bandwidth can be broadened greatly.

As noted above, the gap $g_3$ between the director elements 114 and 116 can be selected to substantially maximize gain in a quasi-endfire direction without inducing spurious radiation in an output radiation pattern. Furthermore, as noted above, the first and second director elements 114 and 116 can be placed substantially symmetrically about the axis 104.

Use of the two director elements 114 and 116 can increase gain of the antenna 100 through constructive interference of radiation directed by the first and second director elements 114 and 116. In an example, radiation emitted by the driven patch 106 can be directed by the first director element 114 at an offset of ϕ from the axis 104 (e.g., the x-axis). Similarly, the second director element 116 can direct radiation emitted by the driven patch 106 at an offset of −ϕ from the axis 104 (e.g., in the x-y plane). Radiation directed by the first director element 114 and the second director element 116 can constructively interfere, causing radiation directed by the director elements 114 and 116 to be substantially maximally directed along the x-axis (e.g., along the axis 104). Through use of the elements in the antenna 100, antenna 100 can be a quasi-endfire antenna that can provide radiation coverage to approximately 90 degrees of a semi-conical coverage area.

Figure 2:
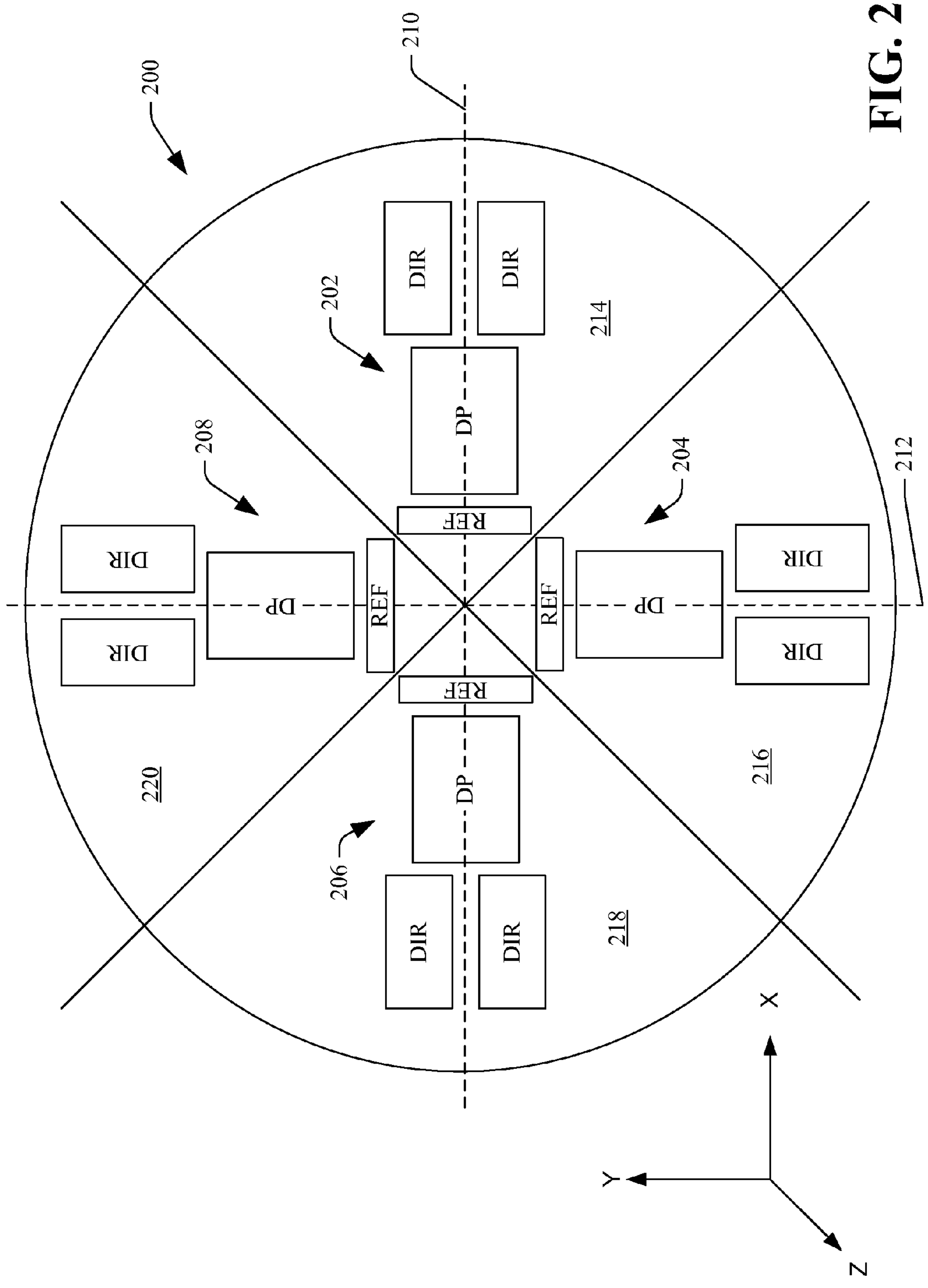
FIG. 2 is an example arrangement of antennas.

Referring now to FIG. 2, an example planar antenna structure 200 is illustrated. As shown, the example antenna structure 200 includes four antennas that are substantially similar to the antenna 100 shown and described in connection with FIG. 1, wherein the four antennas are configured in a cross-like configuration. It is to be understood, however, that the antenna structure 200 can include any number of antennas that are substantially similar to the antenna 100 described in FIG. 1. For instance, an example antenna structure may include eight antennas that are configured in accordance with an octagon. A number of antennas in a planar antenna structure may be based at least in part upon selected distances between elements and antennas such as the antenna shown in FIG. 1.

In the example antenna structure 200, such antenna structure 200 includes four antennas, 202, 204, 206 and 208. Each of the antennas 202-208 can include a driven patch, a reflector element, and two director elements as shown above with respect to FIG. 1. The antennas 202-208 can be configured such that the reflector elements of the respective antennas are positioned towards a center of the cross-like configuration.

The cross-like configuration of the example antenna structure 200 can be defined by two axes 210 and 212, wherein axis 210 is generally along the x-axis and the axis 212 is generally along the y-axis. The antennas 202 and 206 can be positioned approximately symmetrically about the axis 212 and approximately equidistant from the axis 212. Similarly, the antennas 204 and 208 can be positioned approximately symmetrically about the axis 210 and approximately equidistant from the axis 210.

When all four of the antennas 202-208 are simultaneously excited, the example antenna structure 200 can act to emit radiation in a conical fashion. When a single one of the antennas 202-208 in the example antenna structure 200 are excited, the single antenna can emit radiation in an approximately ninety degree region (e.g., a quadrant).

For instance, the first antenna 202 can be configured to emit radiation in a first quadrant 214, the second antenna 204 can be configured to emit radiation in a second quadrant 216, the third antenna 206 can be configured to emit radiation in a third quadrant 218, and the fourth antenna 208 can be configured to emit radiation in a fourth quadrant 220. Furthermore, it can be understood that frequency of radiation emitted by the antenna structure 200 can alter, and thus a radius of the conically emitted radiation can be modified.

Figure 3:
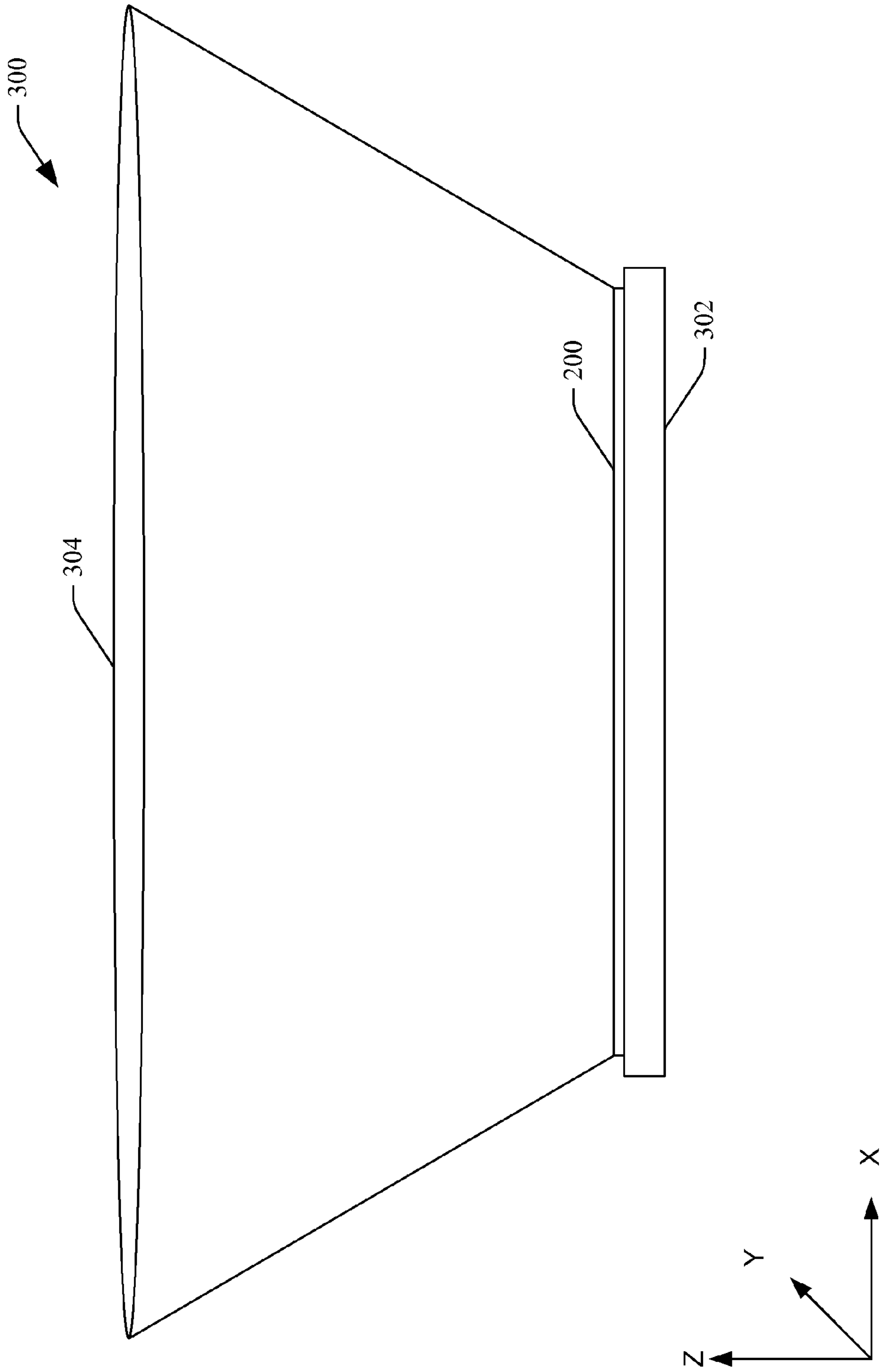
FIG. 3 illustrates an example antenna as well as radiation coverage of such antenna.

Referring now to FIG. 3, a depiction 300 of an example antenna structure (e.g., the antenna structure 200) emitting radiation in a conical fashion is illustrated. The antenna structure 200 is shown as being mounted on a substrate 302. A dielectric constant of the substrate can be below 6, as a substantially maximum center-to-center distance between a driven patch and director elements to facilitate array coupling is a free space quantity that is approximately equal to a freespace wavelength ($\lambda_0$)/2. The size of a driven patch and the director elements can be a function of the guided wavelength $\lambda_G/2$ which varies as a function of the dielectric constant of the substrate 302 and is smaller than a freespace wavelength ($\lambda_G/2<\lambda_0/2$). As noted above, the antenna structure 200 can emit radiation in a conical fashion (e.g., as shown by a conical shape 304) where the radius of such conical shape 304 be based at least in part upon the frequency of radiation emitted by the antenna 200.

Figure 4:
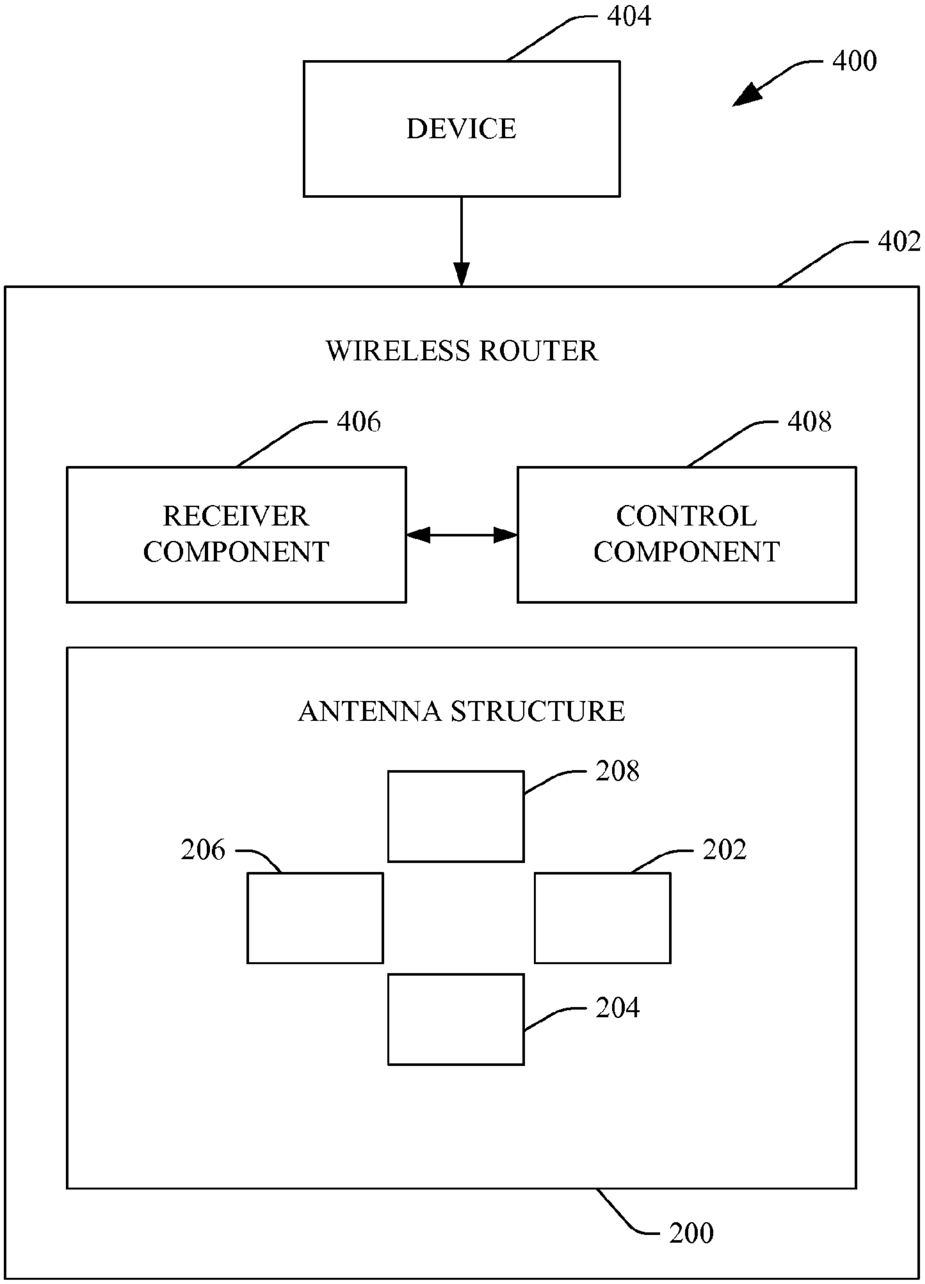
FIG. 4 illustrates an example wireless router.

Referring now to FIG. 4, an example system 400 that facilitates selectively providing power to one or more antennas (e.g., such as the antenna 100) in an antenna structure (e.g., such as the antenna structure 200) is illustrated. The system 400 includes a wireless router 402 that is configured to provide radiation to a device 404 that is a wireless-capable device. The wireless router 402 can include the antenna structure 200 shown in FIG. 2. As noted above, the antenna structure 200 can include four antennas 202, 204, 206 and 208, which can be configured in a substantially similar manner to the antenna 100 described with respect to FIG. 1.

The wireless router 402 can include a receiver component 406 that can receive an indication of a location of the device 404 relative to the wireless router 402. For instance, the device 404 can be a GPS-enabled device which can provide an indication of location to the wireless router 402. In another example, the wireless router 402 can use triangulation or other suitable technique to ascertain the location of the device 404. It is to be understood, however, that any suitable manner for determining location of a device 404 is contemplated and intended to fall under the scope of the hereto appended claims.

The wireless router 402 additionally includes a control component 408 that can selectively provide excitation current to a subset of the plurality of antennas 202-208 based at least in part on the received indication of the location of the device 404. For instance, the control component 408 can determine that the device 404 is within a quadrant that corresponds to the antenna 208 and is not within a quadrant that corresponds to antennas 202-206. Accordingly, the control component 408 can selectively provide excitation current to the antenna 208 without providing excitation current to other antennas in the antenna structure 200.

In another example, the receiver component 406 can determine that two devices desirably receive radiation from the wireless router 402. For instance, the receiver component 406 can receive locations of the two devices with respect to the antenna 206. The control component 408 can determine that a first of the two devices is in a quadrant that corresponds to the antenna 206, and can further determine that the second device is in a quadrant that corresponds to the first antenna 202. Accordingly, the control component 408 can selectively provide excitation current to the antennas 206 and 202 while refraining from providing excitation current to antennas 204 and 208.

In another example, the control component 408 can selectively remove the excitation current from a subset of the plurality of antennas 202-208 based at least in part upon the received indication of the location of the device 404. For instance, initially each of the antennas 202-208 in the antenna structure 200 of the router 402 can be provided with excitation current, thereby causing the router 402 to conically provide radiation over a three hundred and sixty degree region. The receiver component 406 can receive an indication of the location of the device 404 and can determine that the device 404 is the only device within range of the wireless router 402. The device 404 can be in a quadrant that corresponds to the fourth antenna 208. Accordingly, the control component 208 can selectively remove excitation current from the first antenna 202, the second antenna 204, and the third antenna 206.

In yet another example, the control component 408 can selectively provide particular amounts of excitation current to the different antenna structures 202-208 based at least in part upon number of wireless-capable devices in the coverage area of the wireless router 402 and location of such wireless-capable devices in the coverage area or the wireless router 402. For instance, a plurality of wireless devices may be within the coverage area of the wireless router 402, wherein a greatest number of devices are in a quadrant that corresponds to the first antenna 202 and a least number of devices are in a quadrant that corresponds to the third antenna 206. Accordingly, the control component 408 can cause a greater amount of excitation current to be provided to the first antenna 202 when compared to the third antenna 208.

As noted above, the antenna structure 200 and the wireless router 402 can include more or fewer antennas than the four antennas 202-208 depicted in FIG. 4. It can be understood by one skilled in the art that the control component 408 can be adapted to selectively provide or remove excitation current from antennas based at least in part upon a number of antennas in the antenna structure 200.

Figure 5:
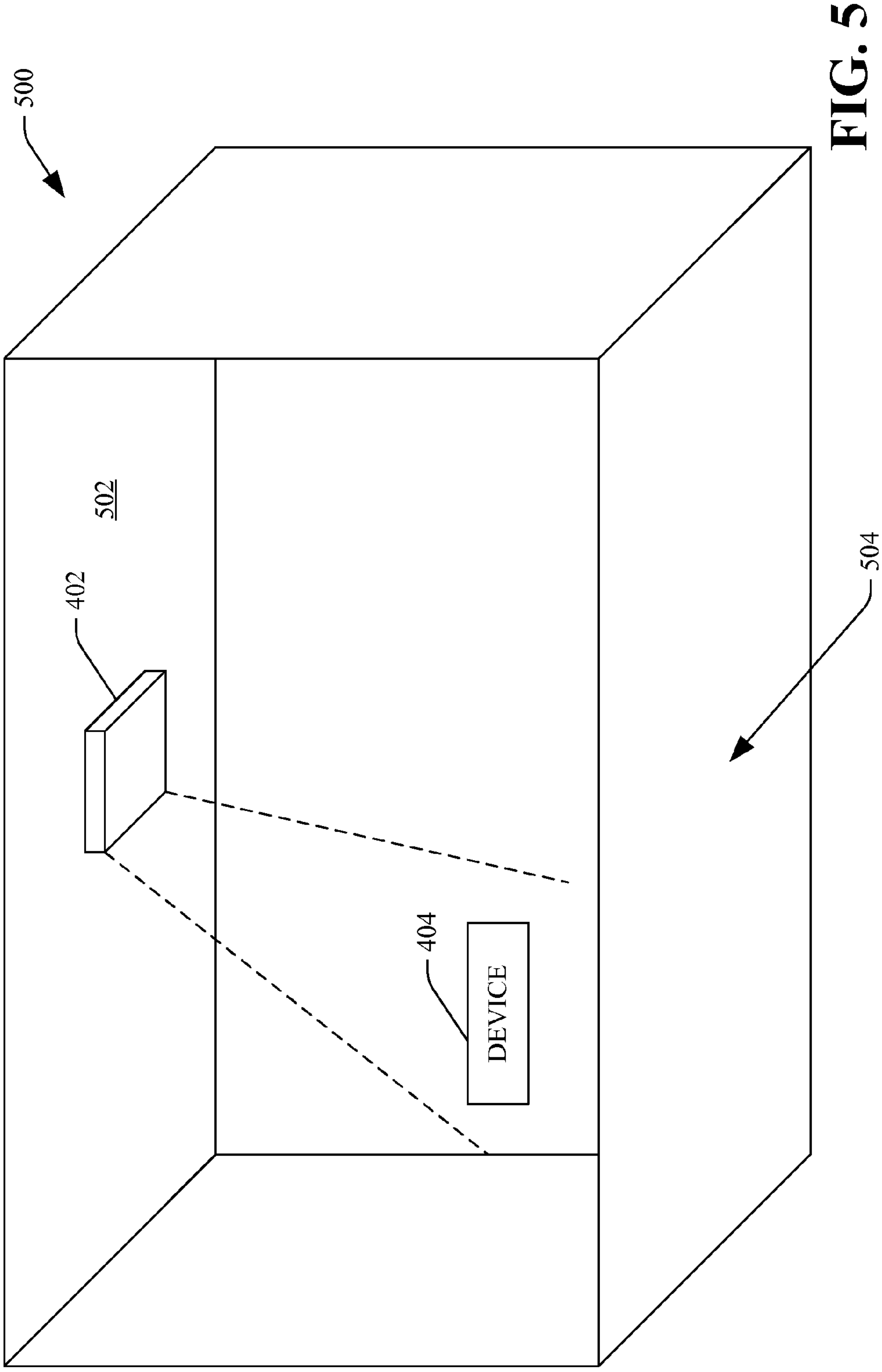
FIG. 5 illustrates an example operation of a wireless router.

Now referring to FIG. 5, an example depiction 500 of operation of the wireless router 402 is illustrated. In this example, the wireless router 402 is configured to be positioned on a ceiling 502 of a room 504 to facilitate providing substantially maximal radiation coverage in the room 504. The device 404 is additionally within the room 504 that includes the wireless router 402. For instance, the device 404 can be a laptop computer, a personal digital assistant, a portable media device, a portable telephone, a videogame controller, or other suitable device that can receive or transmit communications via a wireless connection.

As noted above, the wireless router 402 can be configured to emit radiation in a conical fashion, thereby providing coverage to substantially all portions of the room 504 where wireless devices may be found. Pursuant to an example, the wireless router 402 can include an antenna structure that comprises four antennas, wherein each of the antennas is configured to provide radiation coverage to a particular quadrant of the room 504 (as shown and described with respect to FIG. 4). In the example depicted in FIG. 5, the device 404 is shown as being the sole wireless device in the room 504 that desirably receives radiation from the wireless router 402. Accordingly, excitation current can be provided to an antenna in the wireless router 402 that is configured to provide radiation to a quadrant of the room that includes the device 404, while other antennas in the wireless router 402 (which are not configured to provide radiation coverage to the quadrant where the device 404 resides) are not provided with excitation current. Selectively providing excitation current to an antenna in the wireless router 402 in order to provide radiation coverage to a particular portion of a room can facilitate reduction of use of power, as well as increase the gains seen by the device 404.

Figure 6:
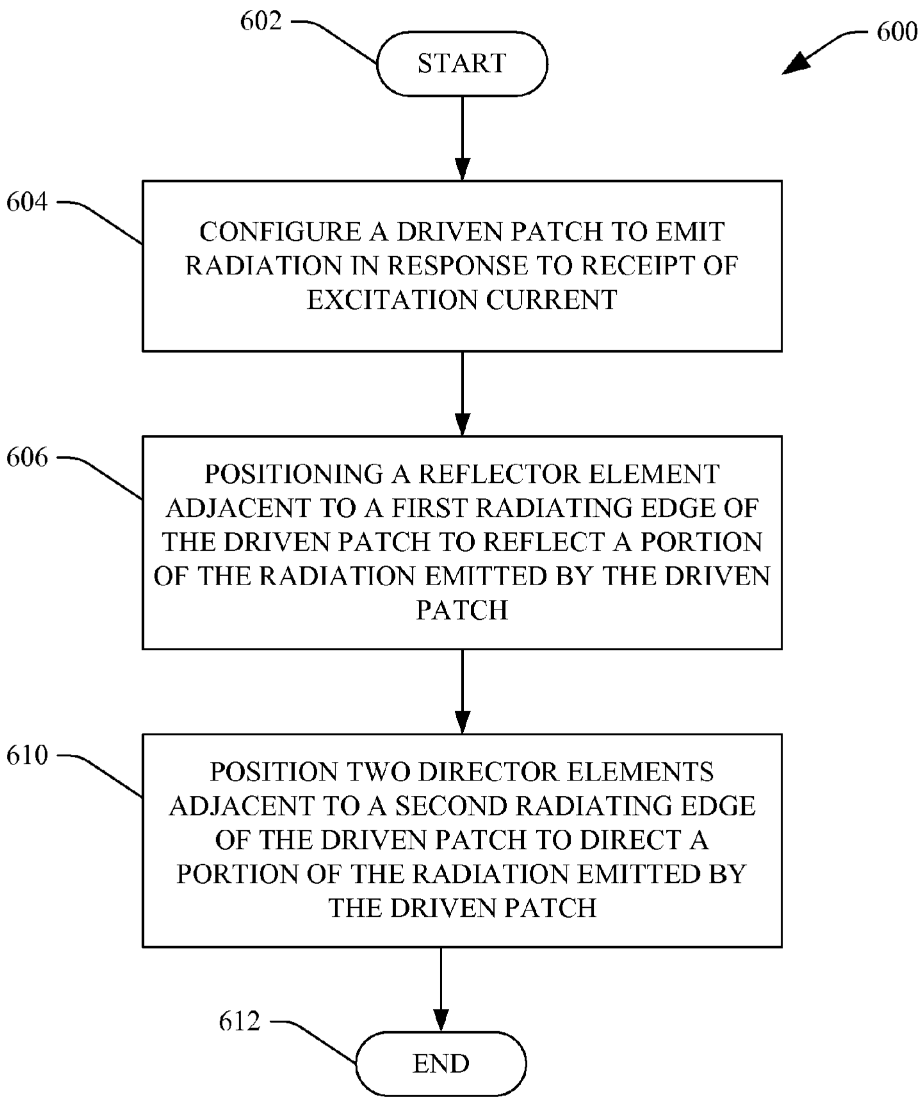
FIG. 6 is a flow diagram that illustrates an example methodology for creating an antenna.
Figure 7:
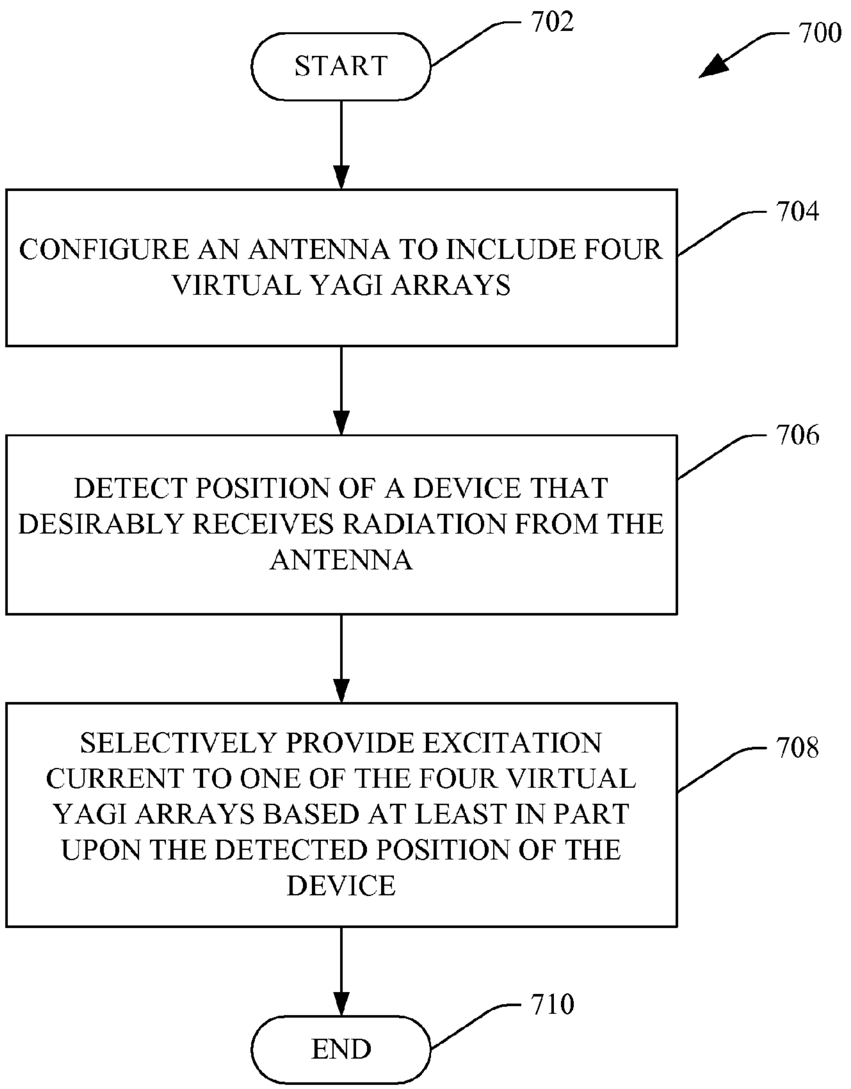
FIG. 7 is a flow diagram that illustrates an example methodology for selectively providing excitation current to one of a plurality of antennas.
Figure 8:
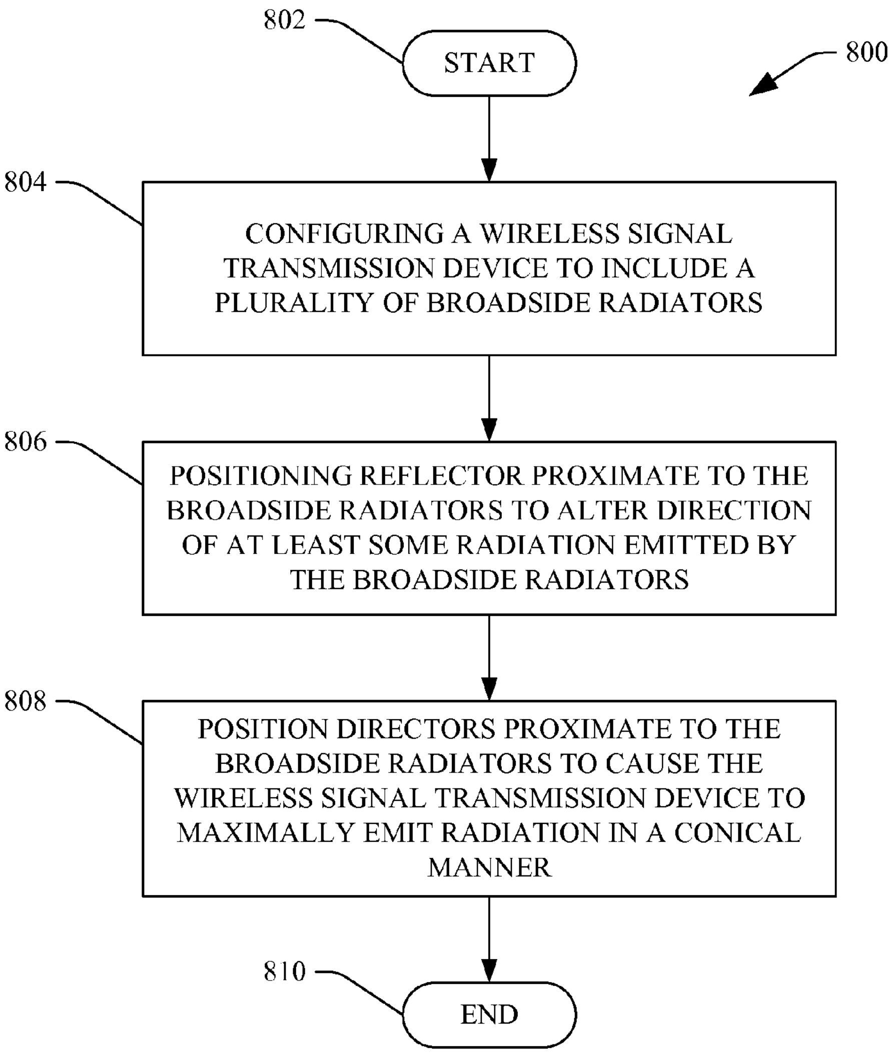
FIG. 8 is a flow diagram that illustrates an example methodology for configuring a wireless router.

With reference now to FIGS. 6-8, various methodologies are illustrated and described. While the methodologies are described as being a series of acts that are performed in a sequence, it is to be understood that the methodologies are not limited by the order of the sequence. For instance, some acts may occur in a different order from what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, a program, a thread of execution, and/or the like. Still further, results of acts of the methodologies may be stored in a computer-readable medium, displayed on a display device, and/or the like.

Referring specifically now to FIG. 6, a methodology 600 that facilitates configuring an antenna for use in a wireless environment is illustrated. The methodology 600 begins at 602, and at 604 a driven patch is configured to emit radiation in response to receipt of excitation current. The driven patch can include a first radiating edge and a second radiating edge, and the driven patch can be configured to emit radiation in a broadside direction.

At 606, a reflector element can be positioned adjacent to the first radiating edge of the driven patch to reflect a portion of radiation emitted by the driven patch. For instance, the reflector element can be configured to reflect radiation emitted by the driven patch to cause radiation to be directed in a quasi-endfire direction.

At 608, two director elements can be positioned adjacent to the second radiating edge of the driven patch to direct a portion of radiation emitted by the driven patch in a quasi-endfire direction. For instance, the two director elements can act together to increase gain and radiation emitted by the driven patch through constructive interference. The methodology 600 completes at 610.

Referring now to FIG. 7, a methodology 700 for selectively providing excitation current to a subset of antennas in a wireless router is illustrated. The methodology 700 starts at 702, and at 704 an antenna structure is configured to include four virtual yagi arrays (antennas). For instance, a virtual yagi array can include a driven patch, a reflector, and two director elements, as shown and described in FIG. 1. Moreover, the four virtual yagi arrays can be arranged in a cross-like configuration, as shown and described with respect to FIG. 2.

At 706, position of a device that desirably receives radiation from the antenna structure is detected. Pursuant to an example, the detected position can be a position of the device relative to position of the wireless router/antenna structure.

At 708, excitation current is selectively provided to one of the four virtual yagi arrays, based at least in part on the detected position of the device. The methodology 700 completes at 710.

Now referring to FIG. 8, an example methodology 800 for configuring an antenna structure is illustrated. The methodology 800 starts at 802, and at 804 a wireless signal transmission device is configured to include a plurality of broadside radiators. The wireless signal transmission device can be or include a wireless router, a cell phone tower, a radio tower, or any other suitable device that is configured to transmit radiation. At 806, reflectors are positioned proximate to the broadside radiators to alter direction of at least some radiation emitted by the broadside radiators. For instance, the reflectors can be configured to reflect radiation in a quasi-endfire direction.

At 808, directors are positioned proximate to the broadside radiators to cause the wireless signal transmission device to maximally emit radiation in a conical manner. Pursuant to example, the wireless signal transmission device may be positioned on a ceiling to provide maximal radiation coverage to a room. The methodology 800 completes at 810.

Figure 9:
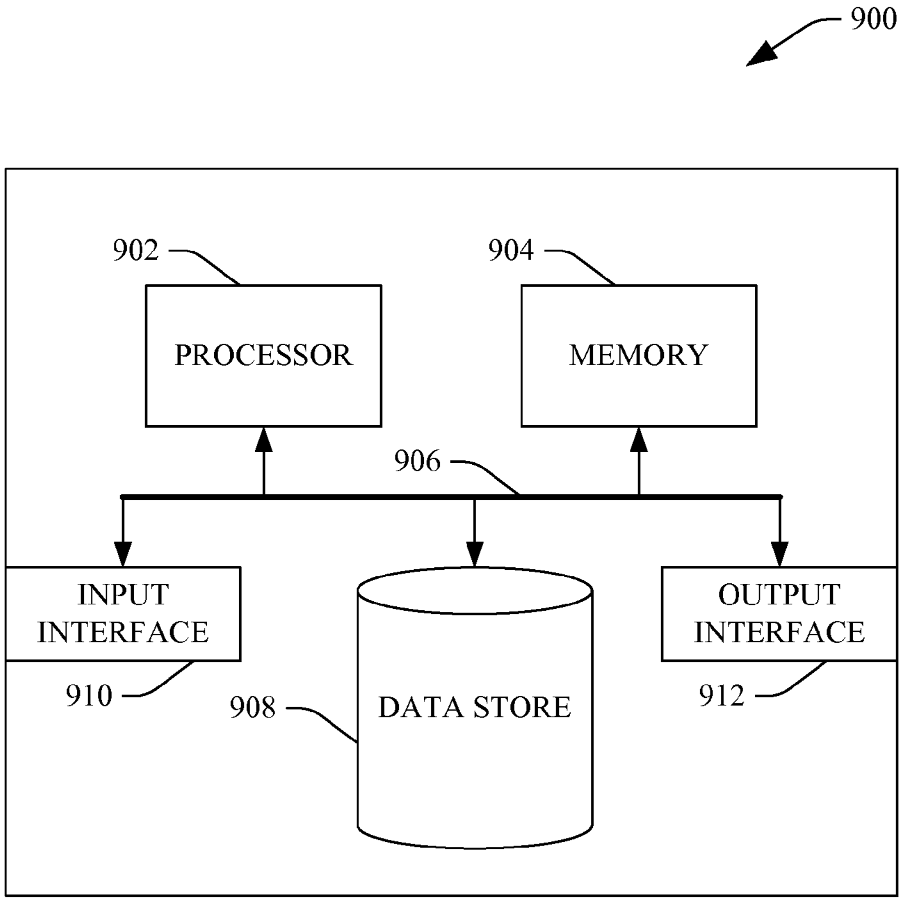
FIG. 9 is an example computing system.

Now referring to FIG. 9, a high-level illustration of an example computing device 900 that can be used in accordance with the systems and methodologies disclosed herein is illustrated. For instance, the computing device 900 may be used in a system that supports transmission or reception of wireless signals. In another example, at least a portion of the computing device 900 may be used in a system that supports selectively providing excitation current to one or more antennas in an antenna structure that includes a plurality of antennas. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store data to be transmitted over a wireless link, IP addresses, etc.

The computing device 900 additionally includes a data store 908 that is accessible by the processor 902 by way of the system bus 906. The data store 908 may include executable instructions, data to be transmitted over a wireless link, IP addresses, etc. The computing device 900 also includes an input interface 910 that allows external devices to communicate with the computing device 900. For instance, the input interface 910 may be used to receive instructions from an external computer device, such as a PDA, a mobile phone, etc. The input interface 910 may also be used to receive instructions from a user by way of an input device, such as a pointing and clicking mechanism, a keyboard, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

For instance, the computing device at 100 may be used in a system that supports transmission of radiation in a wireless environment. In another example, at least a portion of the computing device 900 may be used in a system that supports determining location of a device relative to a wireless transmitter. In addition to storing executable instruction, the memory 904 may also store device configurations, device locations, among other data. The data store 908 may include executable instructions, device configuration, device identities, et cetera. For instance, the input interface 910 may be used to receive instructions from an external computer device input from a user, etc.

What is claimed is:

1. A wireless router, comprising:

a plurality of antennas selectively arranged with respect to one another such that, when each antenna in the plurality of antennas is excited, the wireless router is configured to emit radiation maximally in the form of a cone, wherein an area of radiation coverage emitted from the plurality of antennas is a function of a frequency of the radiation emitted by the wireless router, wherein each antenna in the plurality of antennas is symmetric about a respective axis of symmetry, each antenna in the plurality of antennas comprising:

a driven patch that is bisected by the axis of symmetry, the driven patch being configured to emit radiation in a broadside direction in response to receiving excitation current, the driven patch comprising a first radiating edge and a second radiating edge that are approximately parallel to one another;

a reflector element that is bisected by the axis of symmetry, the reflector element being configured to reflect radiation emitted from the first radiating edge in a quasi-endfire direction;

a first director element that is configured to direct radiation emitted from the second radiating edge of the driven patch in the quasi-endfire direction; and a second director element that is configured to direct radiation emitted from the second radiating edge of the driven patch in the quasi-endfire direction, the first and second director elements positioned on opposing sides of the axis of symmetry such that the axis of symmetry is between the first director element and the second director element;

a processor; and a memory that comprises components that are executed by the processor, the components comprising:

a receiver component that is configured to determine a location of a plurality of wireless computing devices relative to the wireless router, wherein a first number of wireless computing devices are located in a first region primarily covered by a first antenna in the plurality of antennas, and wherein a second number of wireless computing devices are located in a second region primarily covered by a second antenna in the plurality of antennas, wherein the first number is greater than the second number; and a control component that is configured to:

receive the locations of the wireless computing devices; and selectively provide first excitation current of a first magnitude to the first antenna and selectively provide second excitation current of a second magnitude to the second antenna based upon the first number of wireless computing devices being located in the first region and the second number of wireless computing devices being located in the second region, respectively, wherein the first magnitude is greater than the second magnitude.

2. The wireless router of claim 1, wherein the driven patch is a broadside radiator.

3. The wireless router of claim 1, wherein the driven patch is configured to emit radiation maximally along a first axis and the reflector element is configured to reflect radiation along a second axis that is approximately perpendicular to the first axis.

4. The wireless router of claim 3, wherein the first director element and the second director element are configured to direct radiation along the second axis.

5. The wireless router of claim 1, wherein the wireless router is configured to be positioned on a ceiling.

6. The wireless router of claim 1, wherein the plurality of the antennas are configured in a cross-like configuration.

7. The wireless router of claim 6, wherein the control component is configured to selectively remove excitation current from at least one of the antennas of the wireless router based upon a location of a wireless computing device relative to the wireless router.

8. The wireless router of claim 1, wherein each of the antennas is built on a substrate that has a dielectric constant below six.

9. The wireless router of claim 1, wherein a width of the reflector element is greater than a width of the first radiating edge of the driven patch.

10. The wireless router of claim 1, wherein the reflector element is separated from the first radiating edge by a first gap, and wherein the first director element and the second director element are separated from one another by a second gap, wherein the size of the first gap and the second gap is equivalent.

11. The wireless router of claim 1, wherein the first director element and the second director element are positioned on opposing sides of the axis of symmetry to facilitate increasing gain of the antenna by way of constructive interference.

12. A wireless router, comprising:

a plurality of antennas that are selectively arranged relative to one another to generate radiation maximally in the form of a cone, wherein each antenna in the plurality of antennas, when provided with excitation current, is configured to output a respective portion of the cone, and wherein a region of radiation coverage of an antenna is a function of frequency of the excitation current provided to the antenna, wherein each antenna in the plurality of antennas comprises:

a driven patch that is configured to emit radiation in a broadside direction in response to receiving the excitation current, the driven patch comprising a first radiating edge and a second radiating edge that are approximately parallel to one another;

a reflector element that is configured to reflect radiation emitted from the first radiating edge in a quasi-endfire direction;

a first director element that is configured to direct radiation emitted from the second radiating edge of the driven patch in the quasi-endfire direction; and a second director element that is configured to direct radiation emitted from the second radiating edge of the driven patch in the quasi-endfire direction;

a processor; and a memory that comprises a plurality of components that are executed by the processor, the components comprising:

a receiver component that is configured to receive indications of locations of a plurality of wireless computing devices in range of the wireless router, wherein a first number of wireless computing devices in the plurality of computing devices are located in a first coverage area of a first antenna in the plurality of antennas, and wherein a second number of wireless computing devices are located in a second coverage area of a second antenna in the plurality of antennas, wherein the first number is greater than the second number; and a control component that is configured to cause first excitation current to excite the first antenna in the plurality of antennas at a first magnitude based upon the first number of wireless computing devices being located in the first coverage area, wherein the control component is further configured to cause second excitation current to excite the second antenna at a second magnitude based upon the second number of wireless computing devices being located in the second region, wherein the first magnitude is greater than the second magnitude.

13. The wireless router of claim 12, the plurality of antennas arranged in a cross-like configuration.

14. The wireless router of claim 12, wherein the control component is configured to cause the first excitation current to have a first frequency based upon locations of the first number of wireless computing devices relative to the wireless router.

15. The wireless router of claim 12, wherein the wireless router comprises eight antennas.

16. The wireless router of claim 12, wherein at least one indication of location received by the receiver component comprises GPS coordinates of at least one wireless computing device.

* * * * *